US012571253B2

(12) United States Patent
Okachi et al.

(10) Patent No.: US 12,571,253 B2
(45) Date of Patent: Mar. 10, 2026

(54) WIRING STRUCTURE OF TENSION MEMBER IN SCREEN APPARATUS

(71) Applicant: METACO INC., Tokyo (JP)

(72) Inventors: Yasubumi Okachi, Kanagawa (JP); Yuichiro Nishioka, Kanagawa (JP); Hiroaki Ishii, Kanagawa (JP)

(73) Assignee: METACO INC., Tokyo (JP)

( * ) Notice: Subject to any disclaimer, the term of this patent is extended or adjusted under 35 U.S.C. 154(b) by 158 days.

(21) Appl. No.: 18/289,158

(22) PCT Filed: Jun. 2, 2021

(86) PCT No.: PCT/JP2021/020968
§ 371 (c)(1),
(2) Date: Nov. 1, 2023

(87) PCT Pub. No.: WO2022/254603
PCT Pub. Date: Dec. 8, 2022

(65) Prior Publication Data

US 2024/0218736 A1 Jul. 4, 2024

(51) Int. Cl.
*E06B 9/58* (2006.01)
*E06B 9/54* (2006.01)

(52) U.S. Cl.
CPC .................. *E06B 9/58* (2013.01); *E06B 9/54* (2013.01); *E06B 2009/543* (2013.01)

(58) Field of Classification Search
CPC ........ E06B 9/54; E06B 9/58; E06B 2009/543; E06B 2009/587; E06B 2009/588
See application file for complete search history.

(56) References Cited

U.S. PATENT DOCUMENTS

| | | | | |
|---|---|---|---|---|
| 6,186,212 B1 * | 2/2001 | Tsuchida | E06B 9/54 | 160/84.06 |
| 6,318,438 B1 * | 11/2001 | Uno | E06B 9/58 | 160/31 |
| 6,758,255 B2 * | 7/2004 | Sanz | B64C 1/1484 | 160/84.06 |
| 6,978,820 B2 * | 12/2005 | Aoki | E06B 9/52 | 160/84.06 |

(Continued)

FOREIGN PATENT DOCUMENTS

| | | | |
|---|---|---|---|
| DE | 202021100016 U1 * | 3/2021 | E06B 9/58 |
| JP | 2014-91980 | 5/2014 | |
| JP | 2018087433 A * | 6/2018 | |

*Primary Examiner* — Johnnie A. Shablack
(74) *Attorney, Agent, or Firm* — Wenderoth, Lind & Ponack, L.L.P.

(57) ABSTRACT

A connector is connected to a second guide unit positioned at one end in a Z-axis direction of a second guide stored in a storage portion of a slidable frame, is longitudinal in an X-axis direction and has a female part and a male part that is fixable to and separate from the female part. The female part has a pair of connecting pieces having respective third openings into which second pins of a second guide unit are respectively fitted, a fourth opening at one end portion in the Z-axis direction and which is open in the X-axis direction, and a hollow receiving portion extending in the Z-axis direction. The male part is storable in the receiving portion, and opposite ends of a tension member are fixed to the male part. The male part includes a fixing piece which has a fifth opening capable of communicating with the fourth opening.

1 Claim, 4 Drawing Sheets

(56) References Cited

U.S. PATENT DOCUMENTS

| | | | | |
|---|---|---|---|---|
| 7,472,738 | B2 * | 1/2009 | Kamosawa | E06B 9/522 160/31 |
| 7,694,711 | B2 * | 4/2010 | Okachi | E06B 9/58 160/245 |
| 7,717,152 | B2 * | 5/2010 | Moriya | E06B 9/54 160/31 |
| 7,730,926 | B2 * | 6/2010 | Moriya | E06B 9/36 160/84.06 |
| 7,810,543 | B2 * | 10/2010 | Donatelli | E06B 9/54 160/31 |
| 7,931,070 | B2 * | 4/2011 | Chino | E06B 9/52 160/84.06 |
| 7,963,312 | B2 * | 6/2011 | Okachi | E06B 9/262 160/31 |
| 7,984,744 | B2 * | 7/2011 | Karasawa | E06B 9/262 160/84.06 |
| 8,191,601 | B2 * | 6/2012 | Okachi | E06B 9/54 160/31 |
| 8,196,638 | B2 * | 6/2012 | Roberts | E06B 9/54 160/84.06 |
| 8,316,912 | B2 * | 11/2012 | Okachi | E06B 9/52 160/84.06 |
| 8,925,614 | B2 * | 1/2015 | Okachi | E06B 9/54 160/31 |
| 9,487,986 | B2 * | 11/2016 | Okachi | E05D 15/0621 |
| 10,041,294 | B2 * | 8/2018 | Van Loosbroek | E06B 9/262 |
| 10,253,557 | B2 * | 4/2019 | Frede | E06B 9/171 |
| 10,822,868 | B2 * | 11/2020 | Okachi | H02P 7/29 |
| 11,505,991 | B2 * | 11/2022 | Okachi | E06B 9/54 |
| 2011/0203752 | A1 * | 8/2011 | Okachi | E06B 9/54 160/372 |
| 2015/0204137 | A1 * | 7/2015 | Montanaro | E06B 9/54 160/84.02 |
| 2015/0300067 | A1 * | 10/2015 | Okachi | E05D 15/0621 160/105 |
| 2018/0073296 | A1 * | 3/2018 | Chen | E06B 9/56 |
| 2019/0048659 | A1 * | 2/2019 | Toda | E06B 9/58 |
| 2024/0102340 | A1 * | 3/2024 | Zhang | E06B 9/522 |
| 2024/0218734 | A1 * | 7/2024 | Okachi | E06B 9/58 |
| 2024/0218735 | A1 * | 7/2024 | Okachi | E06B 9/54 |
| 2024/0218736 | A1 * | 7/2024 | Okachi | E06B 9/54 |

* cited by examiner

WIRING STRUCTURE OF TENSION MEMBER IN SCREEN APPARATUS

TECHNICAL FIELD

The invention relates to a wiring structure of a tension member in a screen apparatus adaptable to a net door, a partition and the like, as well as a shading and dimming means such as a curtain, a blind and the like.

BACKGROUND ART

Conventionally, the screen apparatus of this kind includes a screen that can be freely expanded and stored: on a premise that an expansion and storage direction of the screen is defined as an X-axis direction in orthogonal three axes including the X-axis, a Y-axis, and a Z-axis, a pair of frames consisting of a first frame and a second frame, at least one of which is a slidable frame in the X-axis direction, which are longitudinal in the Z-axis direction and hollow; and which are disposed opposite to each other in the X-axis direction: a first guide and a second guide each of which has a free end at an end, and which are drawn from an inside of the slidable frame when the slidable frame is slid to one side in the X-axis direction and are stored in the inside of the slidable frame when the slidable frame is slid to the other side in the X-axis direction; and a tension member that is disposed in the Z-axis direction, is stored in the inside of the slidable frame, the tension member connecting the free ends of the first guide and the second guide to form a loop. In the screen apparatus, one end in the X-axis direction of the screen is fixed to the first frame and the other end in the X-axis direction of the screen is fixed to the second frame, a portion of the first guide, which is drawn from the inside of the slidable frame, is configured to extend linearly in the X-axis direction between one end portions in the Z-axis direction of the pair of frames, and a portion of the second guide, which is drawn from the inside of the slidable frame, is configured to extend linearly in the X-axis direction between the other end portions in the Z-axis direction of the pair of the frames (See Patent document No. 1, for example).

In the screen apparatus described in Patent document No. 1, the first guide is formed by connecting a plurality of first guide units, each of the first guide units includes a pair of first side walls disposed opposite to each other in the Y-axis direction when the first guide is drawn from the inside of the slidable frame and a bottom wall connecting both of the side walls, one of two adjacent first guide units is pivotally supported by the other, whereby, while the first guide bends to the other side in the Z-axis direction, the first guide maintains linearity in the X-axis direction, and the one end portion in the Z-axis direction of the expanded screen is inserted between both of the first side walls of each of the first guide units in the portion of the first guide, which is drawn from the inside of the slidable frame.

Additionally, a pair of first pins directing outward in an opposite direction of both of the first side walls are provided at one end parts in the X-axis direction of both of the first side walls of each of the first guide units, respectively, and a pair of first openings are opened in the other end parts in the X-axis direction of both of the first side walls, respectively. Two first guide units are connected to each other by causing each of the first pins of the other of the first guide units to loosely fit in each of the first openings of the one of the first guide units, both of the first pins form a pivot, and each of the first guide units are pivotally movable.

Further, a second guide is formed by connecting a plurality of second guide units. Each of the second guide units includes a pair of second side walls of which lengths in the Z-axis direction are shorter than those of the first side walls, respectively, and which are disposed opposite to each other in the Y-axis direction when the second guide is drawn from the inside of the slidable frame, and a top wall connecting both of the second side walls at the other side in the Z-axis direction. One of two adjacent second guide units is pivotally supported by the other, whereby, while the second guide bends to one side in the Z-axis direction, the second guide maintains linearity in the X-axis direction, and the other end portion in the Z-axis direction of the expanded screen is inserted between both of the second side walls of each of the second guide units in a drawn portion of the second guide from the inside of the slidable frame.

Furthermore, a pair of second pins directing outward in an opposite direction of both of the second walls are provided at one end parts in the X-axis direction of both of the second side walls of each of the second guide units, respectively, and a pair of second openings are opened in the other end parts in the X-axis direction of both of the second side walls. Two adjacent second guide units are connected by causing each of the second pins of the other of the second guide units to loosely fit in each of the second openings of the one of the second guide units, both of the second pins form a pivot, and each of the second guide units are pivotally movable.

Additionally, in the screen apparatus described in Patent document No. 1, the inside of the slidable frame is divided into a first storage portion for storing the first guide at one side in the X-axis direction and a second storage portion for storing the second guide at the other side in the X-axis direction, and the tension member is allowed to pass through both the first storage portion and the second storage portion.

Further, a direction changing member on which the tension member is hung and which causes a direction of the tension member to change in the Z-axis direction at each of the one end portion in the Z-axis direction and the other end portion in the Z-axis direction of the first storage portion of the slidable frame.

REFERENCE

Patent document No. 1: JPA 2014-91980

SUMMARY OF INVENTION

Technical Problem

In the screen apparatus described in Patent document No. 1, since lengths in the Z-axis direction of both of the second side walls of each of the second guide units forming the second guide are shorter than those of both of the first side walls of each of the first guide units forming the first guide, a width in the X-axis direction of the second storage portion for storing the second guide can become shorter than that of the first storage. As a result, a width in the X-axis direction of the slidable frame, i.e., an aspect size can be reduced.

On the other hand, since lengths in the Z-axis direction of both of the first side walls of each of the first guide units are longer than those of both of the second side walls of each of the second guide units, there is no way except a curvature when the first guide bends is larger than that when the second guide bends in order to cause pivotal movements of each of the first guide units to smoothly perform and to store and draw the first guide to and from the inside of the slidable frame. Accordingly, the first storage portion for storing the first guide is disposed at the one side in the X-axis direction of the slidable frame.

Here, the tension member connecting the free ends of the first guide and the second guide and forming the loop causes a storage length and a withdrawal length of the first guide in and from the first storage portion to be equal to those of the second guide in and from the second storage portion and contributes that the slidable frame is caused to parallelly slide with respect to the other frame. Additionally, the tension member also contributes that the parallel sliding of the slidable frame is realized by a closing operation of a user at an arbitrary portion in the Z-axis direction of the slidable frame.

One string and the like is generally adopted to such the tension member. A portion in the middle of a length direction of the tension member is fixed to the free end of the first guide and is hung on the direction changing member that is provided at each of one end portion and the other end portion in the Z-axis direction of the slidable frame, and both one end and the other end of the tension member are fixed to the free end of the second guide. Then, the tension member is wired by being passed in the first storage portion and the second storage portion of the inside of the slidable frame.

As above-mentioned, the tension member is hung on the direction changing member provided at each of the one end portion and the other end portion in the Z-axis direction of the slidable frame and therefore such a wiring operation of the tension member is performed in the inside of the slidable frame. Since the one end in the X-axis direction of the screen is fixed to the other end portion in the X-axis direction of the slidable frame, one end in the X-axis direction of the slidable frame is made into an open end and the wiring operation of the tension member is performed in the first storage portion and the second storage portion of the inside of the slidable frame through the open end. However, since the first storage portion is disposed at a side of the open end of the slidable frame, the second storage portion is further away from the open end of the slidable frame than the first storage portion and therefore the free end of the second guide stored in the second storage portion, to which both the one end and the other end of the tension member are fixed is also positioned away from the open end of the slidable frame. Accordingly, the wiring operation in which both the one end and the other end of the tension member hung on the direction changing members, which are provided at each of the one end portion and the other end portion, respectively, in the Z-axis direction of the slidable frame, respectively, are fixed to the free end of the second guide is not simple but requires a high level of skill.

In the light of the above-mentioned problem, the invention provides a wiring structure of the tension member in the screen apparatus, in which the wiring operation of the tension member is facilitated.

Solution to Problem

The invention presupposes a screen apparatus that includes a screen that can be freely expanded and stored: on a premise that an expansion and storage direction of the screen is defined as an X-axis direction in orthogonal three axes including the X-axis, a Y-axis, and a Z-axis, a pair of frames consisting of a first frame and a second frame, at least one of which is a slidable frame in the X-axis direction, which are disposed opposite to each other in the X-axis direction, and which are longitudinal in the Z-axis direction and hollow: a first guide and a second guide that are drawn from an inside of the slidable frame when the slidable frame is slid to one side in the X-axis direction and are stored in the inside of the slidable frame when the slidable frame is slid to the other side in the X-axis direction, and each of which has a free end at an end: and a tension member that is disposed in the Z-axis direction and stored in the inside of the slidable frame, the tension member connecting the free ends of the first guide and the second guide to form a loop, wherein one end in the X-axis direction of the screen is fixed to the first frame and the other end in the X-axis direction of the screen is fixed to the second frame, a portion of the first guide, which is drawn from the inside of the slidable frame, is configured to extend linearly in the X-axis direction between one end portions in the Z-axis direction of the pair of the frames, and a portion of the second guide, which is drawn from the inside of the slidable frame, is configured to extend linearly in the X-axis direction between the other end portions in the Z-axis direction of the pair of the frames, wherein one end in the X-axis direction of the screen is fixed to the first frame and the other end in the X-axis direction of the screen is fixed to the second frame, a portion of the first guide, which is drawn from the inside of the slidable frame, is configured to extend linearly in the X-axis direction between one end portions in the Z-axis direction of the pair of the frames, and a portion of the second guide, which is drawn from the inside of the slidable frame, is configured to extend linearly in the X-axis direction between the other end portions in the Z-axis direction of the pair of the frames, wherein the first guide is formed by connecting a plurality of first guide units, each of the first guide units comprises a pair of first side walls disposed opposite to each other in the Y-axis direction and a bottom wall connecting both of the first side walls, one of two adjacent first guide units is pivotally supported by the other, whereby, while the first guide bends to the other side in the Z-axis direction, the first guide maintains linearity in the X-axis direction, and the one end portion in the Z-axis direction of the expanded screen is inserted between both of the first side walls of each of the first guide units in the portion of the first guide, which is drawn from the inside of the slidable frame, wherein a pair of first pins directing outward in an opposite direction of both of the first side walls are provided at one end part in the X-axis direction of both of the first side walls of each of the first guide units, respectively, and a pair of first openings are opened in the other end parts in the X-axis direction of both of the first side walls of each of the first guide units, respectively, the two adjacent first guide units are connected by causing each of the first pins of the other of the first guide units to loosely fit in each of the first openings of the one of the first guide units, both of the first pins form a pivot, and each of the first guide units is pivotally movable, wherein the second guide is formed by connecting a plurality of second guide units, each of the second guide units comprises a pair of second side walls which are disposed opposite to each other in the Y-axis direction and of which lengths in the Z-axis direction are shorter than those of the first side walls of the first guide unit, respectively, and a top wall connecting both of the second side walls, one of two adjacent second guide units is pivotally supported by the other, whereby, while the second guide bends to the one side in the Z-axis direction, the second guide maintains linearity in the X-axis direction, and the other end portion in the Z-axis direction of the expanded screen is inserted between both of the second side walls of each of the second guide units in the portion of the second guide, which is drawn from the inside of the slidable frame, wherein a pair of second pins directing outward in an opposite direction of both of the second side walls are provided at one end parts in the X-axis direction of both of the second side walls of each of the second guide units, respectively, and a pair of second openings are opened in the other end parts in the X-axis direction of both of the second side walls of each of the second guide units, respectively, the two adjacent second guide units are connected by causing each of the second pins of the other of the second guide units to loosely fit in each of the second openings of the one of the second guide units, both of the second pins form a pivot, and each of the second guide units is pivotally movable, wherein the inside of the slidable frame is divided into a first storage portion for storing the first guide at the one side in the X-axis direction and a second storage portion for storing the second guide at the other side in the X-axis direction, and the tension member is allowed to pass through both the first storage portion and the second storage portion, and wherein a direction changing member is provided at each of the one end portion and the other end portion in the Z-axis direction of the first storage portion of the slidable frame. Additionally, in a wiring structure of the tension member in the screen apparatus of the invention, a connector that is longitudinal in the Z-axis direction and forms the free end of the second guide is connected to the second guide unit positioned at one end in the Z-axis direction of the second guide which is stored in the second storage portion of the slidable frame, and the connector has, at the other end portion in the Z-axis direction, a pair of connecting pieces that opposes to each other in the Y-axis direction and in which a third opening is opened, a female part in which a fourth opening in the X-axis direction for fastening is opened in one end portion in the Z-axis direction thereof, and a male part that is separate from and fixable to the female part. Further, in a wiring structure of the tension member in the screen apparatus of the invention, each of the second pins of the second guide unit positioned at the one end in the Z-axis direction in the second storage portion is loosely fitted in the third opening, a hollow receiving portion that extends in the Z-axis direction of which at least the one end in the X-axis direction is opened is formed in the female part, the male part is storable in the receiving portion of the female part, a fixing piece in which a fifth opening that can communicate with the fourth opening of the female part is opened extends from the one end portion of the female part to one side in the Z-axis direction, and both one end and the other end of the tension member are fixed to the male part. Furthermore, in a wiring structure of the tension member in the screen apparatus of the invention, the male part of the connector has a pair of claws protruding to the other side in the Z-axis direction at both end portions in the Y-axis direction, which are positioned at the other end in the Z-axis direction, a first slit extending to one side in the Z-axis direction is formed at the other end portion in the Z-axis direction of the male part of the connector, a long hole extending from the other end portion in the Z-axis direction to one end portion in the Z-axis direction is opened in the male part, a window hole is opened in the one end portion in the Z-axis direction of the male part of the connector, a second slit extending from one end in the Z-axis direction of the window hole to the one end in the Z-axis direction of the male part is formed, and a pair of locking holes capable of being locked with each of the claws of the male part of the connector are formed at the other end portion in the Z-axis direction of the receiving portion of the female part of the connector. Furthermore, in a wiring structure in the tension member of the screen apparatus of the invention, in a state where the tension member stored in the first storage portion of the slidable frame is fixed to the free end of the first guide, both a portion at one end side of the tension member, which is hung on one of the direction changing members and is positioned at one end portion in the Z-axis direction of the slidable frame, and a portion at the other end side of the tension member, which is hung on the other of the direction changing members and is positioned at the other side in the Z-axis direction of the slidable frame, are configured to be drawn from one end in the X-axis direction of the first storage portion of the slidable frame to an outside of the slidable frame, a ball knot is configured to be formed at each of tip ends of the portion at the one end side and the portion at the other end side of the tension member, respectively, one of the ball knots, which is positioned at the one end side of the tension member, is configured to be inserted into the second slit through the window hole of the male part of the connector and to be hooked and fixed to the one end portion in the Z-axis direction of the male part, the portion at the other end side of the tension member is configured to be hung around the other side in the X-axis direction of a head part of a first screw from the other side in the Z-axis direction, the other of the ball knots, which is positioned at the other end side of the tension member, is configured to be inserted into the first slit of the male part and to be hooked and fixed to the other end portion in the Z-axis direction of the first slit, the first screw is configured to be inserted into the long hole and to be temporarily tightened to a nut disposed at a portion of the first screw, which protrudes from the long hole to the other side in the X-axis direction of the male part, the male part is configured to be inserted into the second storage portion through the first storage portion of the slidable frame, each of the craws of the male part is configured to be stored in the second storage portion and to be inserted into and locked with each of the locking holes of the receiving portion of the female part of the connector connected to the second guide unit positioned at the one end in the Z-axis direction, whereby the male part is configured to be stored in the receiving portion of the female part, and, in the stored state of the male part in the receiving portion of the female part, the fourth opening of the female part and the fifth opening of the male part are configured to communicate with each other, a second screw is configured to be tightened from the fifth opening to the fourth opening, whereby the male part is fastened and fixed to the female part, a tension applied to the tension member is configured to be adjusted by causing the first screw to move in the Z-axis direction along the long hole, and the first screw is configured to be completely tightened to the nut.

According to the invention, at the time of a wiring operation of the tension member, both of the portions at the one end side and the other end side of the tension member can be drawn from the open end that is the one end in the X-axis direction of the slidable frame while the state where the tension member is hung on the direction changing members which are provided at each of the one end portion and the other end portion in the Z-axis direction of the slidable frame, respectively, remains, and, in the drawn state, both the one end and the other end in the X-axis direction of the tension member can be fixed to the male part of the connector forming the free end of the second guide at an outside of the slidable frame. Additionally, the male part to which both the one end and the other end of the tension member can be stored in and fixed to the receiving portion of the female part of the connector connected to the second guide positioned at one end in the Z-axis direction of the second guide stored in the second storage portion. Accordingly, the fixing of the one end and the other end of the tension member to the free end of the second guide is facilitated and the wiring operation of the tension member is generally facilitated. As a result, the high level of skill is not particularly required in the wiring operation of the tension member.

DESCRIPTION OF EMBODIMENTS

Figure 1:
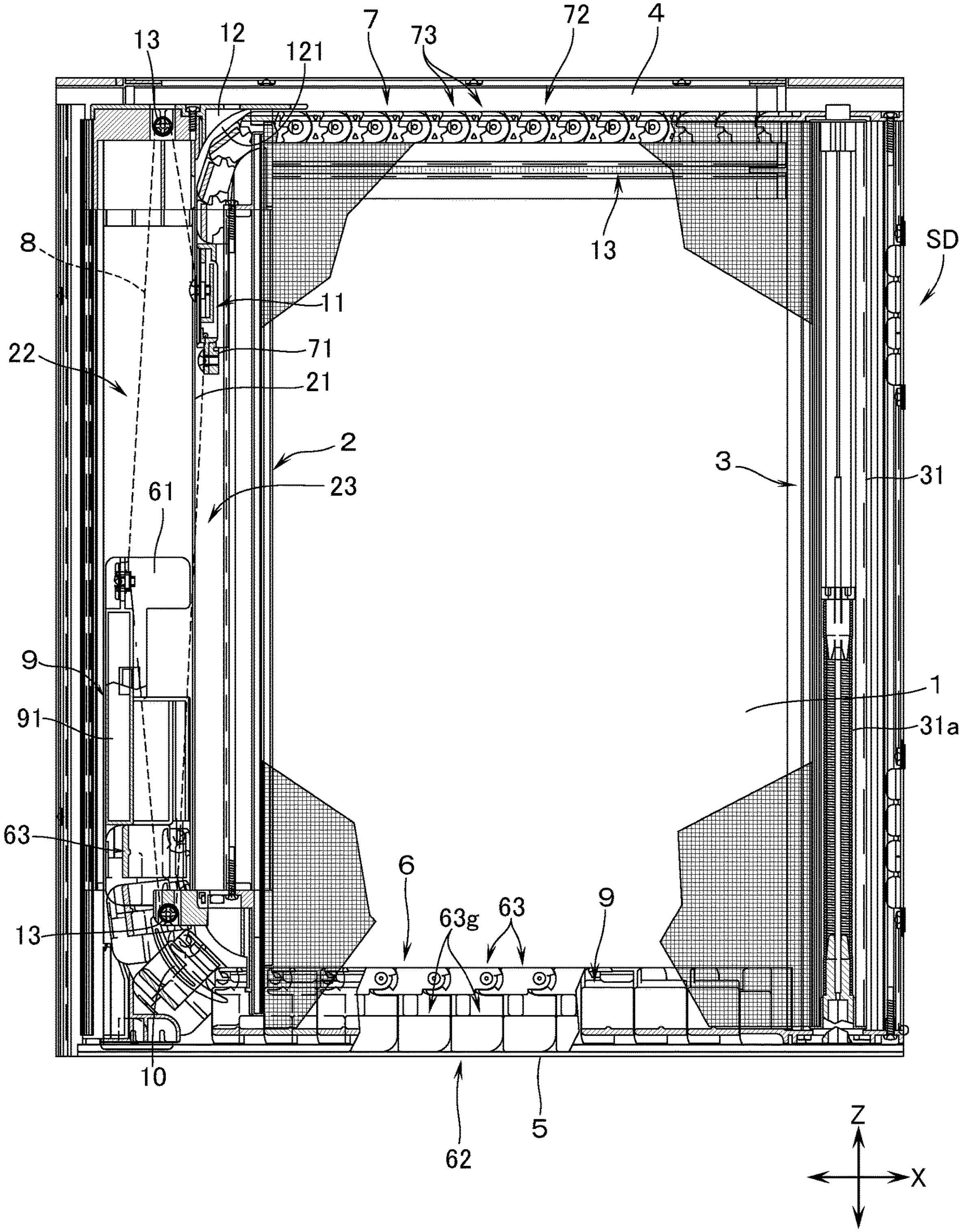
FIG. 1 is a partially notched cross section of a screen apparatus to which an embodiment of a wiring structure of a tension member in the screen apparatus of the invention is adapted.

Referring to FIG. 1, a screen apparatus SD includes a screen 1 that can be freely expanded and stored, is installed in an opening such as a window frame, door frame, and the like, and the opening is opened and closed in a horizontal direction by the screen 1, for example. In other words, in the screen apparatus SD, an expansion and storage direction is defined as an X-axis direction in orthogonal three axes including the X-axis, a Y-axis, and a Z-axis, the X-axis direction corresponds to the horizontal direction, i.e., a left-right direction in FIG. 1, and the Z-axis direction corresponds to a vertical direction, i.e., a top-bottom direction in FIG. 1. Accordingly, in the following, one side in the X-axis direction is defined to be left and the other side in the X-axis direction is defined to be right, and one side in the Z-axis direction is defined to be lower and the other side in the Z-axis direction is defined to be upper.

The screen apparatus SD includes a first frame 2 that is slidable in the left-right direction in the opening, is longitudinal in the top-bottom direction, and is hollow; and a second frame 3 that is disposed opposite to the first frame 2 in the left-right direction, is fixed to a right end portion of the above-mentioned opening, is longitudinal in the top-bottom direction, and is hollow: A pair of frames consist of the first frame 2 and the second frame 3. A left end of the screen 1 is fixed to the first frame 2 and a right end of the screen 1 is fixed to the second frame 3. Specifically, the left end of the screen 1 is fixed to a right end portion of the first frame 2 and the right end of the screen 1 is fixed to a portion in the top-bottom direction of an outer peripheral part of a roller pipe 31 that is longitudinal in the top-bottom direction, is hollow; and is rotatably stored in an inside of the second frame 3. When a user of the screen apparatus SD performs a closing operation that causes the first frame 2 to slide leftward, the screen 1 is unwound from the outer peripheral part of the roller pipe 31 and is expanded in the opening, and when the user stops the closing operation, the screen 1 is wound around the outer peripheral part of the roller pipe 31 and is stored in the inside of the second frame 3. At this time, the first frame 2 automatically slides rightward and when a right end of the first frame 2 comes into contact with a left end of the second frame 3, the sliding of the first frame 2 to the right is automatically stopped.

In order to realize such an automatic storage of the screen 1 in the inside of the second frame 3, a coil spring 31*a* is built in the inside of the roller pipe 31. When the first frame 2 is slid leftward, the roller pipe 31 rotates forward in the inside of the second frame 3, and the screen 1 is unwound from the outer peripheral part of the roller pipe 31, the coil spring 31*a* is twisted around a rotation axis of the roller pipe 31, and an elastic force is generated and accumulated. When the user stops the closing operation, the accumulated elastic force is released, the roller pipe 31 reverses in the inside of the second frame 3, and the screen 1 is wound around the outer periphery of the roller pipe 31.

Additionally, in order to smoothly realize the sliding in the left-right direction of the first frame 2, the screen apparatus SD includes an upper rail 4 and a lower rail 5. The upper rail 4 is provided at an upper end portion of the opening and the lower rail 5 is provided at a lower end of the opening. The upper rail 4 is a hollow member of which a section in the top-bottom direction is U-shaped and an upper end portion of the first frame 2 is inserted into an inside of the upper rail 4. The lower rail 5 is longitudinal in the left-right direction and a linear member. Wheels, not shown, are provided at a lower end portion of the first frame 2 and roll on the lower rail 5. Thus, since the siding in the left-right direction of the first frame 2 is guided by the upper rail 4 and the lower rail 5, the sliding of the first frame 2 in the left-right direction is smoothly realized.

Further, the screen apparatus SD includes a first guide 6 and a second guide 7 that are drawn from the inside of the first frame 2 when the first frame 2 is slid leftward, and which is stored in the inside of the first frame 2 when the first frame 2 is slid rightward. The first guide 6 and the second guide 7 have free ends 61, 71 at an end, respectively, portions 62, 72 drawn from the inside of the first frame 2 maintain linearity in the left-right direction and extend in the left-right direction between the lower end portions and the upper end portions of the first frame 2 and second frame 3 as the pair of the frames, respectively. Furthermore, the screen apparatus SD includes a tension member 8 that is stored in the inside of the first frame 2 and connects the free ends 61, 71 of the first guide 6 and the second guide 7. The tension member 8 is made into a non-crossing loop and is disposed in the top-bottom direction.

Figure 2:
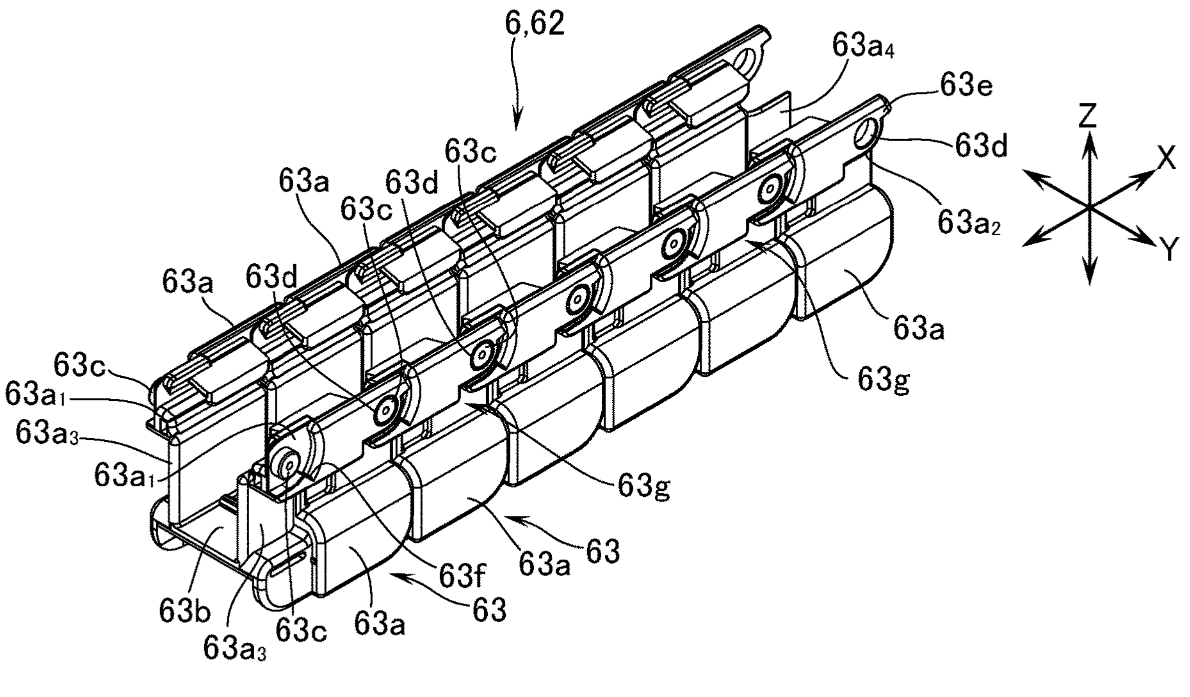
FIG. 2 is a main perspective view of an embodiment of a first guide shown in FIG. 1.

Referring to FIG. 2, the first guide 6 is formed by connecting a plurality of first guide units 63. Each of the first guide units 63 includes a pair of side walls 63*a*, 63*a* that are disposed opposite to each other in the Y-axis direction and a bottom wall 63*b* connecting both of the side walls 63*a*, 63*a*. In the first guide 6, one of two adjacent first guide units 63, 63 is pivotally supported by the other. Therefore, the first guide 6 not only maintains linearity in the left-right direction but also upwardly bends. Upper left end parts and upper right end parts of both of the side walls 63*a*, 63*a* of each of the first guide units 63 correspond to an upper end portion of the portion 62 of the first guide 6 drawn from the inside of the first guide 6. A pair of first pins 63*c*, 63*c* directing outward in an opposite direction of both of the side walls 63*a*, 63*a* are provided at the upper left end parts of both of the side walls 63*a*, 63*a*, and a pair of first openings 63*d*, 63*d* are opened in the upper right end parts of both of the side walls 63*a*, 63*a*.

Specifically, a first recessed part 63$a_1$ recessed inward in the opposite direction of both of the side walls 63*a*, 63*a* is formed at a peripheral part of each of the first pins 63*c* in each of the side walls 63*a* of each of the first guide units 63. A length of each of the first pins 63*c* is equal to a depth of the first recessed part 63$a_1$, and an outer diameter of each of the first pins 63*c* and an inner diameter of each of the first openings 63*d* have such a size that each of the first pins 63*c* can be loosely fitted in each of the first openings 63*d*. Additionally, a first notched part 63$a_2$ is formed by notching a peripheral part of each of the first openings 63*d* with leaving an upper end edge part of each of the side walls 63*a* and the upper end edge part becomes a protruding piece 63*e* extending rightward. Further, a hill part 63*f* upwardly rising is provided at a right and lower end portion of the first recessed part 63$a_1$. Furthermore, similar to the first recessed part 63$a_1$, a second recessed part 63$a_3$ recessed inward in the opposite direction of both of the side walls 63*a*, 63*a* is formed at a left end part of each of the side walls 63*a*. Then, the bottom wall 63*b* is disposed at a position corresponding to a lower end portion of the second recessed part 63$a_3$ of both of the side walls 63*a*, 63*a* in each of the first guide units 63, and has a length from a left end of the second recessed part 63$a_3$ to a left and lower end of the first notched part 63$a_2$.

In the first guide 6, the two adjacent first guide units 63, 63 are connected by inserting the left end parts of both of the side walls 63*a*, 63*a* of the other of the first guide units 63 into inner sides in the opposite direction of both of the side walls 63*a*, 63*a* of the right end parts of one of the first guide units 63 and by loosely fitting each of the first pins 63*c* of the other of the first guide units 63 in each of the first openings 63*d* of one of the first guide units 63. At this time, both of the first pins 63*c*, 63*c* form a pivot. The first guide 6 is formed by repeating such connection of the two adjacent first guide units 63, 63. A pivotal movement range of the two adjacent first guide units 63, 63 is from a position at which the right ends of the lower end parts of both of the side walls 63*a*, 63*a* of the one of the first guide units 63 and the left ends of the lower end parts of both of the side walls 63*a*, 63*a* of the other of the first guide units 63 contact each other to a position at which each of the protruding pieces 63*e* of both of the side walls 63*a*, 63*a* of the one of the first guide units 63 and the hill part 63*f* of each of the first recessed parts 63$a_1$ that are formed at both of the side walls 63*a*, 63*a* of the other of the first guide units 63 contact each other. The pivotal movement range of each of the first guide units 63 is identical, and due to the pivotal movement in the above-mentioned pivotal movement range of each of the first guide units 63, the first guide 6, as shown in FIG. 1, bends so as to direct toward the upper end portion of the first frame 2 when the first guide 6 is stored in the inside of the first frame 2, and the first guide 6 directs rightward and returns to a linear state when the first guide 6 is drawn from the inside of the first frame 2.

Additionally, since the above-mentioned pivot is positioned at the upper end part of the each of the first guide units 63, the above-mentioned pivot is disposed upwardly away from the lower end of the above-mentioned opening in which the screen apparatus SD is installed. Accordingly, the pivot is less susceptible to dust, sand, mud, and the like which are easily accumulated on the lower end of the above-mentioned opening, and coupled with the smooth bending of the first guide 6, a closing operation of the first frame 2 by the user is lightly and stably performed.

Further, a concave part 63*g* that extends in the same direction as the portion 62 of the first guide 6, which is drawn from the inside of the first frame 2, extends and is recessed inward in the opposite direction of both of the side walls 63*a*, 63*a* is provided with both of the side walls 63*a*, 63*a* of each of the first guide units 63. A second recessed part 63$a_3$ is positioned at the left end part of both of the side walls 63*a*, 63*a* with which the concave part 63*g* is provided and is recessed inward in the opposite direction of both of the side walls 63*a*, 63*a* more than the concave part 63*g*. Additionally, at the right end part of each of the side walls 63*a* with which the concave part 63*g* is provided, the inner surface in the opposite direction of each of the side walls 63*a* is notched to form a second notched part 63$a_4$.

When the first guide 6 is drawn from the inside of the first frame 2 and each of the first guide units 63 pivotally moves, the second notched part 63$a_4$ of the first guide unit 63 that pivotally moves overlaps with the second recessed part 63$a_3$ of the adjacent first guide unit 63 that has finished pivotally moving. The linearity of the portion 62 of the first guide 6, which is drawn from the inside of the first frame 2, is maintained by such overlapping and a contact between the right ends of the lower parts of both of the side walls 63*a*, 63*a* of the first guide unit 63 that pivotally moves and the left ends of both of the side walls 63*a*, 63*a* of the first guide unit 63 that has finished pivotally moving.

Returning to FIG. 1, a right end of the first guide 6 is fixed to the lower end portion of the second frame 3 to be a fixed end. Additionally, the free end 61 of the first guide 6 is always stored in the inside of the first frame 2. Specifically, the free end 61 is positioned at an upper end of an adjuster 9 that moves up and down in the top-bottom direction in the inside of the first frame 2. The adjuster 9 is connected to the first guide unit 63 positioned at an upper end when the first guide 6 is stored in the inside of the first frame 2. A longitudinal in the top-bottom direction and lumpy weight 91 is provided with the adjuster 9. A gravitational force acting on the weight 91 acts on a portion of the first guide 6, which is stored in the inside, and assists the first guide 6 to be smoothly drawn rightward from the inside of the first frame 2 against the elastic force of the coil spring 31*a* built in the roller pipe 31 when the first frame 2 is caused to slide leftward. Additionally, the gravitational force acting on the weight 91 provides suitable resistance to the storage of the first guide 6 in the inside of the first frame 2 when the screen 1 is stored in the inside of the first frame 2. Rapid winding around the outer periphery of the roller pipe 31 of the screen 1 due to release of the elastic force accumulated in the coil spring 31*a* is suppressed by the resistance.

A curved protrusion 10 curved with a prescribed curvature is provided at a pair of inner side surfaces, not shown, opposite to each other in the Y-axis direction shown in FIG. 1. The curved protrusion 10 guides the storage of the first guide 6 in the inside of the first frame 2 and the withdrawal of the first guide 6 from the inside of the first frame 2 due to insertion of the curved protrusion 10 into the concave part 63*g* of each of the first guide units 63. In other words, the curved protrusion 10 is curved by the prescribed curvature that can bend the first guide 6 so as to direct the first guide 6 smoothly upward in the inside of the first frame 2 and return the first guide 6 rightward. Accordingly, a smoother storage of the first guide 6 in the inside of the first frame 2 and a smoother withdrawal of the first guide 6 from the inside of the first frame 2 are realized.

In the screen apparatus SD, when the first guide 6 is drawn from the inside of the lower portion of the first frame 2 rightward accompanying the leftward sliding of the first frame 2, a lower end portion of the screen 1 is inserted between both of the side walls 63*a*, 63*a* of each of the first guide units 63 in the drawn portion 62 of the first guide 6.

In this connection, an integrally molded product made of a hard resin can be adopted to each of the first guide units 63. A cloth and a net knitted with fibers made of a resin, and the like can be adopted to the screen 1 under consideration of weight reduction. Additionally, the curved protrusion 10 can be made of a material such that each of the first guide units 63 does not easily wear out even though the curved protrusion 10 is inserted repeatedly into the concave part 63*g* of each of the first guide units 63.

Figure 3A:
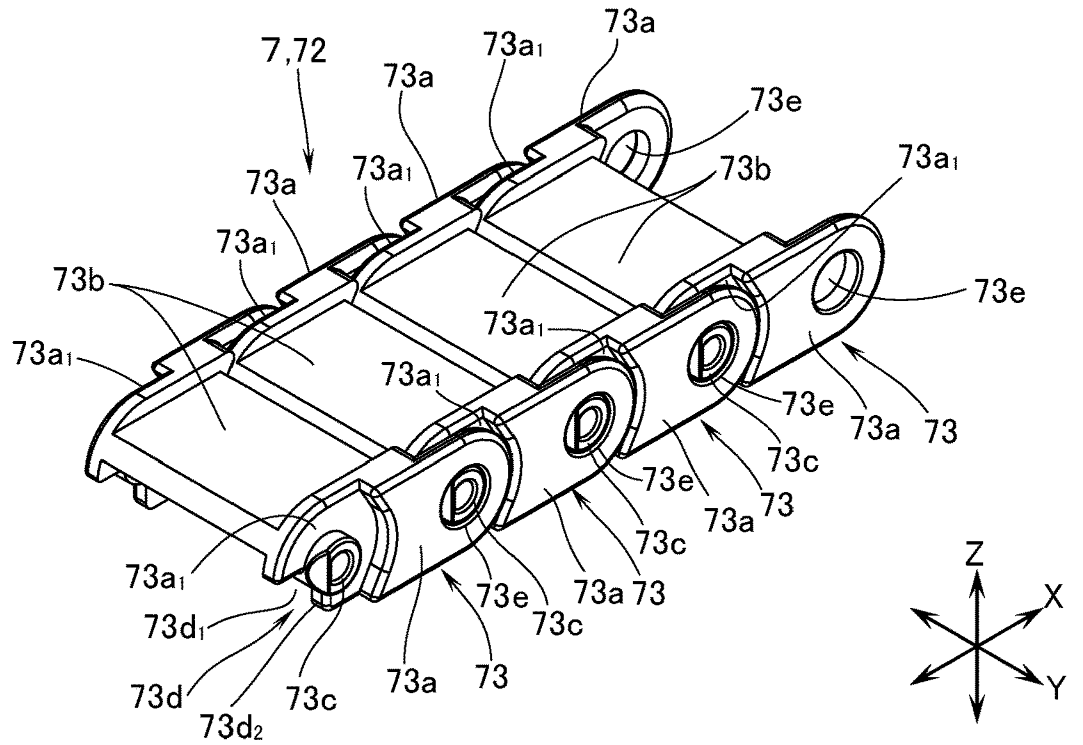
FIG. 3A is a main perspective view of an embodiment of a second guide shown in FIG. 1
Figure 3B:
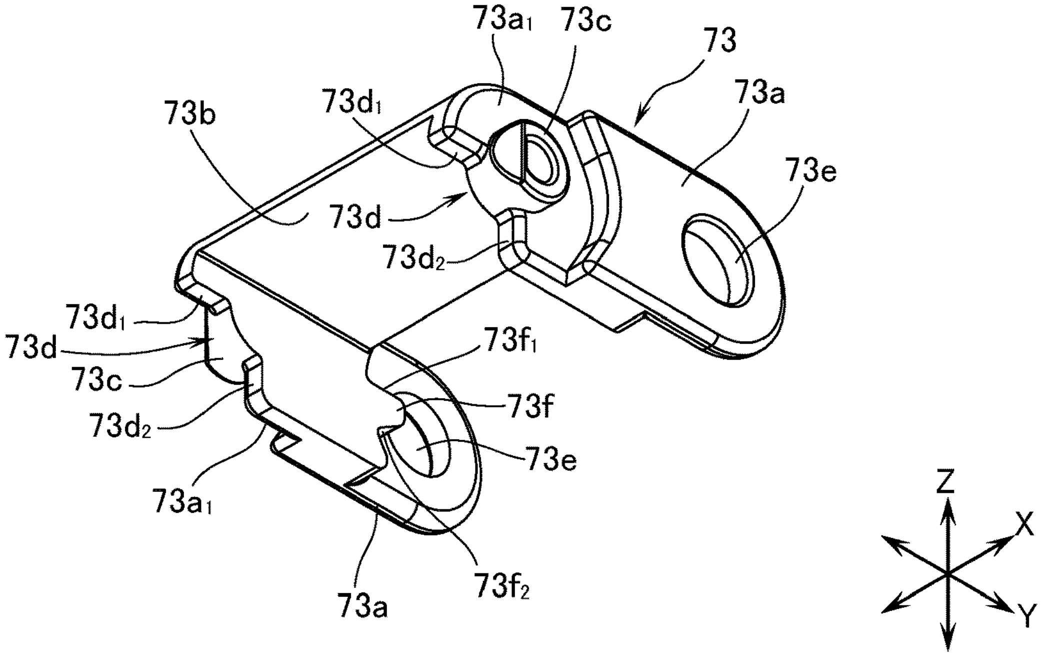
FIG. 3B is a perspective view of a second guide unit shown in FIG. 1.

Referring to FIGS. 3A and 3B, the second guide 7 is formed by connecting a plurality of second guide units 73. Each of the second guide units 73 includes a pair of side walls 73*a*, 73*a* disposed opposite to each other in the Y-axis direction and a top wall 73*b* connecting both of the side walls 73*a*, 73*a*. Lengths in the top-bottom direction of both of the side walls 73*a*. 73*a* are shorter than those in the top-bottom direction of both of the side walls 63*a*, 63*a* of each of the first guide units 63 shown in FIG. 2.

In the second guide 7, one of two adjacent second guide units 73, 73 is pivotally supported by the other. The second guide 7 bends downward while maintaining linearity in the left-right direction due to such the pivotal support. Specifically, a recessed part $73a_1$ recessed inward in an opposite direction of both of the side walls 73*a*, 73*a* is formed at a left half part ranging from a center to a left end of each of the side walls 73*a* of each of the second guide units 73. In each of the recessed parts $73a_1$, a left end is formed in an arcuate shape and a right end is formed in a semicircular shape. Additionally, a pair of second pins 73*c*, 73*c* directing outward in the opposite direction of both of the side walls 73*a*, 73*a* are provided at a central portion of each of the recessed parts $73a_1$. A length of each of the second pins 73*c* is equal to a depth of the recessed part $73a_1$. Further, in each of the recessed parts $73a_1$, a portion from each of the second pins 73*c* to the left end and a portion from each of the second pins 73*c* to a lower end are notched to form a notched part 73*d*. The notched part 73*d* has one end surface $73d_1$ linearly extending leftward and the other end surface $73d_2$ linearly extending downward.

Additionally, in the right half part of each of the second guide unit 73, which ranges from the center to the right end of each of the side walls 73*a* and in which the right end is formed into the semicircular shape, a pair of the second openings 73*e*, 73*e* that pierce in the Y-axis direction is opened. An inner diameter of each of the second openings 73*e* is a size such that each of the second pins 73*c* can be loosely fitted in each of the second openings 73*e*. Further, a protrusion 73*f* adjacent to each of the second openings 73*e* is provided at inner sides in the opposite direction of both of the side walls 73*a*, 73*a* of each of the second guide units 73. In each of the protrusions 73*f*, an upper surface $73f_1$ is a plane linearly extending rightward and a lower surface $73f_2$ is a slope inclined with respect to the upper surface $73f_1$. An inclination angle of the lower surface $73f_2$ with respect to the upper surface $73f_1$ can be adjusted, for example, by about 30°.

In the second guide 7, the two adjacent second guide units 73, 73 are connected by causing the left half parts of both of the side walls 73*a*, 73*a* of the other of the second guide units 73 to insert into the inner sides in the opposite direction of both of the side walls 73*a*, 73*a* of the right half parts of one of the second guide units 73 and by causing each of the second pins 73*c* of the other of the second guide units 73 to loosely fit in each of the second openings 73*e* of one of the second guide units 73. At this time, both of the second pins 73*c*. 73*c* form a pivot. The second guide 7 is formed by repetition of such the connection. A pivotal movement range of the two adjacent second guide units 73, 73 is from a position at which the upper surface $73f_1$ of the protrusion 73*f* of the one of the second guide units 73 comes into to contact with one end surface $73d_1$ of the notched part 73*d* of the other of the second guide units 73 to a position at which the lower surface $73f_2$ of the protrusion 73*f* comes into contact with the other end surface $73d_2$ of the notched part 73*d* (for example, about 60°). The pivotal movement range of each of the second guide units 73 is identical and, due to the pivotal movement within the above-mentioned pivotal movement range of each of the second guide units 73, when the second guide 7, as shown in FIG. 1, is stored in the inside of the first frame 2, the second guide 7 bends to direct toward the lower end portion of the first guide 6, and when the second guide 7 is drawn from the inside of the first frame 2, the second guide 7 directs rightward, returns to the linear state, and the drawn portion 72 maintains the linearity:

The right end of such the second guide 7, like the right end of the first guide 6, is also fixed to the upper end portion of the second frame 3 to be a fixed end. Additionally, the free end 71 of the second guide 7 is always stored in the inside of the first frame 2. Specifically, the free end 71 is positioned at a lower end part of a connector 11 that moves up and down in the top-bottom direction.

In this connection, in the screen apparatus SD, the first guide 6 and the second guide 7 that are stored in the inside of the first guide 6 are stored in different regions of the inside of the first frame 2, respectively. In other words, except both of the upper and lower end portions of the first frame 2, a guiding piece 21 extending in the longitudinal direction of the first frame 2 and protruding inward in the opposite direction of both of the inner side surfaces is provided with each of a pair of inner side surfaces that oppose in the Y-axis direction of the first frame 2. The inside of the first frame 2 is divided into a first storage portion 22 for storing the first guide 6 and a second storage portion 23 for storing the second guide 7 by both of the guiding pieces 21. The first storage portion 22 is positioned at a left side that is one side in the X-axis direction of the inside of the first frame 2 and the second storage portion 23 is positioned at a right side that is the other side in the X-axis direction of the inside of the first frame 2. A left end of the first storage portion 22, i.e., a left end of the first frame 2 is an open end. The open end can be closed by a cover, not shown.

Thus, the first guide 6 and the second guide 7 that are stored in the inside of the first frame 2 do not collide with each other but can pass each other in the inside of the first frame 2 due to the division of the storage regions of the first guide 6 and the second guide 7 in the first frame 2 into the first storage portion 22 and the second storage portion 23. Therefore, an entire length of each of the first guide 6 and the second guide 7 can correspond to a size in the left-right direction of the opening in which the screen apparatus SD is installed. Additionally, in each of the first guide units 63 of the first guide 6, in order to make it less susceptible to dust, sand, mud, and the like that are easily accumulated on the lower end of the above-mentioned opening in which the screen apparatus SD is installed, the bottom wall 63*b* in the drawn portion 62 of the first storage portion 22 is positioned away from the lower rail 5. Therefore, a size in the top-bottom direction of each of the first guide units 63 of the first guide 6 becomes relatively large. Accordingly, the curvature for bending the first guide 6 when the first guide 6 is stored in and drawn from the first storage portion 22 can become relatively large due to the first storage portion 22 that is positioned at the left side in the inside of the first frame 2, and the storage of the first guide 6 in the first storage portion 22 and the withdrawal of the first guide 6 from the first storage portion 22 are performed more smoothly.

Additionally, protruding ends of both of the guiding pieces 21, 21 are disposed away from each other in the Y-axis direction and the tension member 8 is allowed to pass through both of the first storage portion 22 and the second storage portion 23. Further, both of the guiding pieces 21, 21 guide up and down movements of the adjuster 9 of the first guide 6 and guide up and down movements of the connector 11 that is longitudinal in the top-bottom direction, is connected to the second guide unit 73 which is positioned at the lower end portion when the second guide 7 is stored in the second storage portion 23, and forms the free end 71 of the second guide 7.

Additionally, in the screen apparatus SD, a bending guide 12 having a curved surface 121 curved by a prescribed curvature is provide at the upper end portion of the second storage portion 23 of the first frame 2. The curved surface 121 of the bending guide 12 can come into contact with the top wall 73*b* of each of the second guide units 73 forming the second guide unit 7. The bending guide 12 causes each of the second guide units 73 to pivotally move to bend the second guide 7 downward due to contact between the curved surface 121 and the top wall 73*b* of each of the second guide units 73, causes the second guide 7 to return the linear state, and causes the second guide 7 to be stored in and drawn from the second storage portion 23 in the left-right direction accompanying sliding of the first frame 2 in the left-right direction. The prescribed curvature of the curved surface 121 is appropriately set under consideration of such the bending and returning of the second guide 7.

Further, in the screen apparatus SD, direction changing members 13, 13 such as a pulley are provided at the upper and lower end portions of the first storage portion 22 of the first frame 2, respectively. The tension member 8 is hung on each of the direction changing members 13, and each of the direction changing members 13 causes a direction of the tension member 8 to change in the Z-axis direction and applies a prescribed tension to the tension member 8.

Figure 4A:
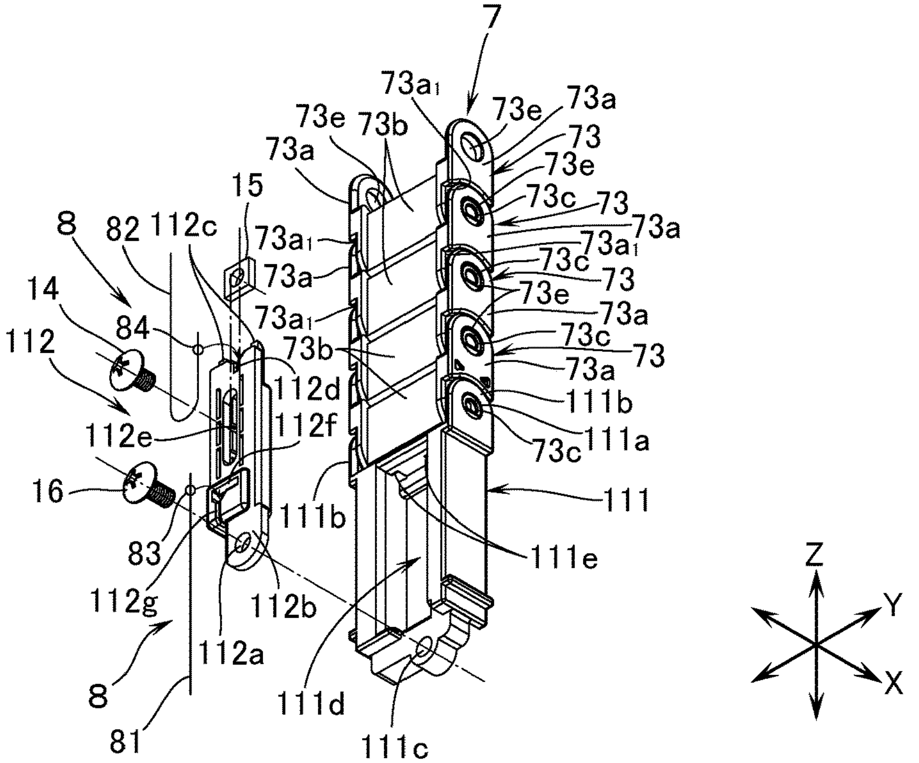
FIG. 4A is a main disassembled perspective view showing the wiring structure of the tension member shown in FIG. 1
Figure 4B:
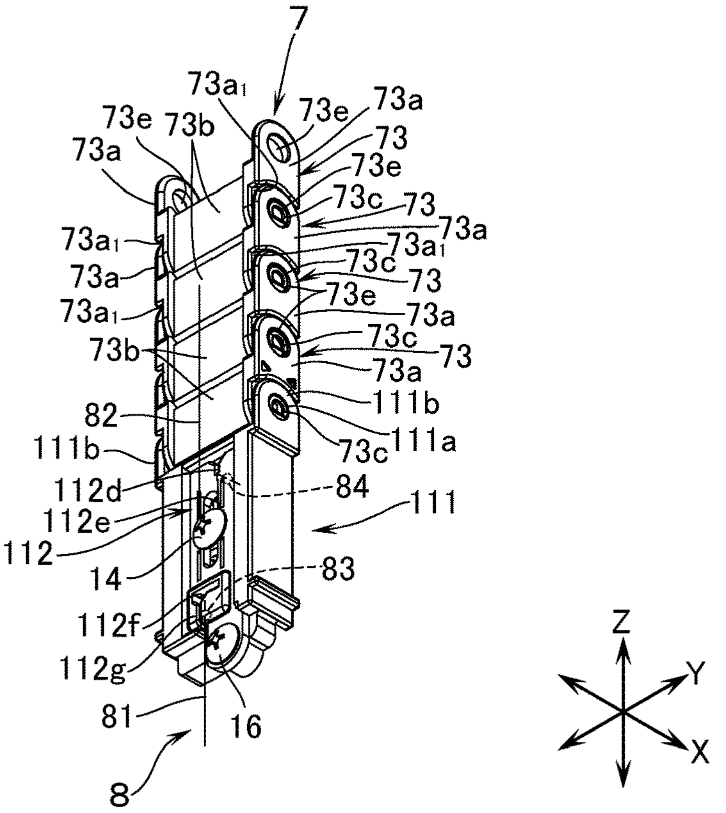
FIG. 4B is a main perspective view showing a wiring state of the tension member.

Referring to FIGS. 4A and 4B, the connector 11 includes a female part 111 that is connected to the second guide unit 73 which is positioned at a lower end of the second guide 7 which is stored in the second storage portion 23 of the first frame 2 shown in FIG. 1, and a male part 112 to which both one and the other ends of the tension member 8 are fixed, and which is separate from and possible to be fastened to the female part 111.

The female part 111 has, at an upper end portion thereof, a pair of connecting pieces 111*b* opposing to each other in the Y-axis direction, in which a third opening 111*a*, in which each of the second pins 73*c* of the second guide unit 73 is loosely fitted, is opened. In a lower end portion of the female part 111, a fourth opening 111*c* for fastening the male part 112 is opened in the left-right direction. Additionally, a hollow receiving portion 111*d* extending in the top-bottom direction and opened in the left-right direction is formed in the female part 111. The male part 112 is storable in the receiving portion 111*d* of the female part 111 and, in the male part 112, a fixing piece 112*b* in which a fifth opening 112*a* capable of communicating with the fourth opening 111*c* of the female part 111, is opened in the left-right direction is extended downward from a lower end portion. Additionally, the male part 112 has a pair of claws 112*c*, 112*c* protruding upward at both of end portions in the Y-axis direction positioned at an upper end thereof. Further, in the male part 112, a first slit 112*d* extending downward is formed at the upper end portion and a long hole 112*e* extending from the upper end portion to the lower end portion is opened. Furthermore, in the male part 112, a window hole 112*f* that is longitudinal in the Y-axis direction is opened at a lower end portion and a second slit 112*g* extending downward from a lower end of the window hole 112*f* is formed. Then, a pair of locking holes Ille, Ille, each of which can lock with the claws 112 of the male part 112, are formed at an upper end portion of the receiving portion 111*d* of the female part 111.

When a wiring operation that is shown in FIG. 1 and in which wiring of the tension member 8 to which, for example, a string and the like is adapted is performed in the inside of the first frame 2 of the screen apparatus SD, before storing the second guide 7 in the second storage portion 23 of the first frame 2, each of the second pins 73*c* is caused to loosely fit in each of the third openings 111*a* to connect the second guide unit 73, which is positioned at the lower end at the time when the second frame 3 is stored in the second storage portion 23, to the female part 111 of the connector 11. In this state, the second guide 7 is not stored in the second storage portion 23 of the first frame 2 but is disposed at an outside of the first frame 2. Then, the wiring operation of the tension member 8 is performed.

In the wiring operation of the tension member 8, first, a portion 81 at one end side of the tension member 8 is drawn in the first storage portion 22 through the open end that is the left end of the first frame 2, and after the portion 81 is hung on the one of the direction changing members 13, which is positioned at the lower end portion of the first storage portion 22, from a left side to a right side thereof, the portion 8*a* of one end portion of the tension member 8 is drawn outwardly from the first storage portion 22 through the open end. Thereafter, a ball knot 83 is formed at a tip end of the portion 81 of the tension member 8. Then, at the outside of the open end of the first frame 2, the ball knot 83 positioned at one end side of the tension member 8 is inserted into the second slit 112*g* of the male part 112 of the connector 11 through the window hole 112*f*. The ball knot 83 is hooked at and fixed to the lower end portion of the male part 112.

Subsequently, a portion 82 at the other end side of the tension member 8 is hung on the other of the direction changing members 13, which is positioned at the upper end portion of the first storage portion 22, from a left side to a right side thereof, and the portion 82 at the other end side of the tension member 8 is drawn from the first storage portion 22 through the open end to the outside of the first frame 2. Thereafter, a ball knot 84 is formed at a tip end of the portion 82 at the other end side of the tension member 8. Then, the portion 82 at the other end side of the tension member 8 is hung from above on a portion of a first screw 14, which is positioned at a right side from the head part thereof, and the ball knot 84 is inserted into the first slit 112*d* of the male part 112. The ball knot 84 is hooked at and fixed to a lower end of the first slit 112*d*. In this state, the first screw 14 is inserted into the long hole 112*e* of the male part 112 and the first screw 14 is temporarily tightened to a square nut 15 that has disposed at a right end of the long hole 112*e*. In a state where both the portions 81 at the one end side and the portion 82 at the other end side of the tension member 8 are fixed to the male part 112 of the connector 11, an appropriate place of a portion between the portion 81 at the one end side and the portion 82 at the other end side of the tension member 8 is fixed to the free end 61 of the first guide 6 shown in FIG. 1 by a screw and the like so as to be pressed leftward.

Next, the second guide 7 to which the female part 111 of the connector 11 is connected is stored in the second storage portion 23 of the first frame 2 shown in FIG. 1 so that the female part 111 is positioned at the lower end portion thereof. Thereafter, the male part 112 of the connector 11 in the above-mentioned state is inserted into the second storage portion 23 from the open end of the first frame 2 through the first storage portion 22. At this time, each of the claws 112*c* of the male part 112 is inserted into and locked with each of the locking holes Ille of the receiving portion 111*d* of the female part 111, and the male part 112 is stored in the receiving portion 111*d* of the female part 111. In the stored state, the fourth opening 111*c* of the female part 111 and the fifth opening 112*a* opened in the fixing piece 112*b* of the male part 112 communicate with each other. Then, a second screw 16 such as a tapping screw is tightened from the fifth opening 112*a* to the fourth opening 111*c*, and the male part 112 is fastened and fixed to the female part 111. Thereafter, the first screw 14 that has been temporarily tightened is moved in the top-bottom direction along the long hole 112*e* to adjust a tension applied to the tension member 8 and the first screw 14 is completely fastened to the square nut 15.

As above-mentioned, at the time of the wiring operation of the tension member 8, both the portion 81 at the one end portion and the portion 82 at the other side portion of the tension member 8 can be drawn to the outside from the open end that is the left end of the first frame 2 in the state where the tension member 8 is hung on each of the direction changing members 13 that are provided at the lower and upper end portions of the first storage portion 22 of the first frame 2, and both the one end and the other end of the tension member 8 in the drawn state can be fixed to the male part 112 of the connector 11 forming the free end 71 of the second guide 7 at the outside of the first frame 2. Then, the male part 112 to which both the one end and the other end of the tension member 8 are connected can be stored in and fixed to the receiving portion 111*d* of the female part 111 of the connector 11 that is connected to the second guide unit 73 positioned at the lower end of the second guide 7 which is stored in the second storage portion 23. Accordingly, the fixing of the one end and the other end of the tension member 8 to the free end 71 of the second guide 7 is facilitated and the wiring operation of the tension member 8 is generally facilitated. As a result, a high level of skill is not particularly required for the wiring operation of the tension member 8.

Though the invention is descried regarding the above-mentioned embodiment, the invention is not restricted to the above-mentioned embodiment. For example, in addition to such the automatic storage manner using the elastic force of the coil spring 31*a* as in the above-mentioned embodiment, an automatic opening and closing manner using a torque when a motor for expanding and storing the screen 1 rotates and an opening and closing manner manually performing both of the expansion and the storage of the screen 1 may be applicable to the screen apparatus SD. Additionally, a foldable screen 1 in which a plurality of pleats are formed can be adopted to the screen 1. Further, in the case of the screen apparatus SD of the manual opening and closing manner, the second frame 3 is not fixed to the above-mentioned opening and is made slidable in the left-right direction like the first frame 2, whereby a screen apparatus SD can be a double opening manner. Furthermore, the Z-axis direction is not limited to the vertical direction but is an orthogonal direction with respect to the X-axis direction. For example, the screen apparatus SD can be installed in an inclined opening that is inclined with respect to the vertical plane. Additionally, the receiving portion 111*d* of the female part 111 of the connector 11 need not pierce in the X-axis direction as long as at least one end is opened in the X-axis direction. The female part 111 may be a concaved part concaved to the other side in the X-axis direction as long as the male part 112 can be fixed to the female part 111 by locking of each of the claws 112*c* and screwing of the second screw 16. Further, regarding the wiring operation, as long as both the portion 81 at the one end side and the portion 82 at the other end side of the tension member 8 are fixed to the male part 112 of the connector 11 at the outside of the slidable frame such as the first frame 2, the male part 112 to which both the portion 81 at the one end side and the portion 82 at the other end side of the tension member 8 are fixed is stored in the second storage portion 23 of the slidable frame through the first storage portion 22, and the male part 112 is fastened and fixed to the female part 111 of the connector 11 that is connected to the second guide 7 stored in the second storage portion 23, procedures of the wiring operation are not particularly limited.

EXPLANATION OF SYMBOLS

SD Screen apparatus
1 Screen
2 First frame
22 First storage portion
23 Second storage portion
3 Second frame
6 First guide
61 Free end of first guide 6
62 Drawn portion of the first guide 6 from inside of first frame 2
63 First guide unit
63*a* First side wall
63*b* Bottom wall
63*c* First pin
63*d* First opening
7 Second guide
71 Free end of second guide 7
72 Drawn portion of second guide 7 from inside of first frame 2
73 Second guide unit
73*a* Second side wall
73*b* Top wall
73*c* Second pin
73*e* Second opening
8 Tension member
81 Portion at one end side of tension member 8
82 Portion at the other end side of tension member 8
83, 84 Ball knot
11 Connector
111 Female part
111*a* Third opening
111*b* Connecting piece
111*c* Fourth opening
111*d* Receiving portion
111*e* Locking hole
112 Male part
112*a* Fifth opening
112*b* Fixing piece
112*c* Claw
112*d* First slit
112*e* Long hole
112*f* Window hole
112*g* Second slit
13 Direction changing member
14 First screw
15 Nut (Square nut)
16 Second screw

What is claimed is:

1. A wiring structure of a tension member in a screen apparatus, in which, a screen that can be freely expanded and stored; stored is provided, an expansion and storage direction of the screen is defined as an X-axis direction among three orthogonal axes including the X-axis, a Y-axis, and a Z-axis, the X-axis direction and a Z-axis direction each have first and second opposite sides, a pair of frames are provided, the pair of frames consisting of a first frame and a second frame, at least one of which is a slidable frame in the X-axis direction, the first and second frames being disposed opposite to each other in the X-axis direction, being longitudinal in the Z-axis direction, and the first and second frames each having first and second end portions in the Z-axis direction, and the screen has first and second ends in the X-axis direction and first and second end portions in the Z-axis direction, the first side in the X-axis direction is defined as corresponding to the first end of the screen in the X-axis direction, the second side in the X-axis direction is defined as corresponding to the second end of the screen in the X-axis direction, the first side in the Z-axis direction is defined as corresponding to the first end portion of the screen in the Z-axis direction, and the second side in the Z-axis direction is defined as corresponding to the second end portion of the screen in the Z-axis direction, wherein the screen apparatus comprises:

a first guide and a second guide that are drawn from an inside of the at least one slidable frame when the at least one slidable frame is slid to the first side in the X-axis direction and are stored in the inside of the at least one slidable frame when the at least one slidable frame is slid to the second side in the X-axis direction, the first guide and the second guide each having a first end and a second end in the X-axis direction, one of the first and second ends of each of the first and second guides being a free end; and a tension member that is disposed in the Z-axis direction and stored in the inside of the at least one slidable frame, the tension member having a first end and a second end in the Z-axis direction, the tension member connecting the free end of the first guide and the free end of the second guide to form a loop, wherein the first end of the screen in the X-axis direction is fixed to the first frame and the second end of the screen in the X-axis direction is fixed to the second frame, a portion of the first guide, which is drawn from the inside of the at least one slidable frame, is configured to extend linearly in the X-axis direction between the second end portion of the first frame in the Z-axis direction and the second end portion of the second frame in the Z-axis direction, and a portion of the second guide, which is drawn from the inside of the at least one slidable frame, is configured to extend linearly in the X-axis direction between the first end portion of the first frame in the Z-axis direction and the first end portion of the second frame in the Z-axis direction, wherein the first guide is formed by connecting a plurality of first guide units, each of the first guide units comprises a pair of first side walls which are disposed opposite to each other in the Y-axis direction, each first side wall having first and second end parts in the X-axis direction, and a bottom wall connecting both of the first side walls, wherein one of two adjacent first guide units is pivotally supported by another of the two adjacent first guide units, whereby, while the first guide bends to the first side in the Z-axis direction, the first guide maintains linearity in the X-axis direction, and the second end portion in the Z-axis direction of the expanded screen is inserted between both of the first side walls of each of the first guide units in the portion of the first guide, which is drawn from the inside of the at least one slidable frame, wherein each first side wall of each of the first guide units includes a first pin extending outward at the first end part of the first side wall on the first side in the X-axis direction, and a first opening that is opened in the second end part of the first side wall on the second side in the X-axis direction, the two adjacent first guide units being connected by fitting, with clearance, each of the first pins of the other of the two adjacent first guide units fit in each of the first openings of the one of the two adjacent first guide units, each of the first pins forming a pivot, and each of the first guide units is pivotally movable, wherein the second guide is formed by connecting a plurality of second guide units, each of the second guide units comprises a pair of second side walls which are disposed opposite to each other in the Y-axis direction, and a top wall connecting both of the second side walls, each second side wall having first and second end parts in the X-axis direction, each second side wall having a length in the Z-axis direction that is shorter than that of each of the first side walls of the first guide unit, wherein one of two adjacent second guide units is pivotally supported by another of the two adjacent second guide units, whereby, while the second guide bends to the second side in the Z-axis direction, the second guide maintains linearity in the X-axis direction, and the first end portion in the Z-axis direction of the expanded screen is inserted between both of the second side walls of each of the second guide units in the portion of the second guide, which is drawn from the inside of the at least one slidable frame, wherein each second side wall of each of the second guide units includes a second pin extending outward at the first end part of the second side wall on the first side in the X-axis direction, and a second opening that is opened in the second end part of the second side wall on the second side in the X-axis direction, the two adjacent second guide units being connected by fitting, with clearance, each of the second pins of the other of the two adjacent second guide units in each of the second openings of the one of the two adjacent second guide units, each of the second pins forming a pivot, and each of the second guide units is pivotally movable, wherein the inside of the at least one slidable frame is divided into a first storage portion for storing the first guide and a second storage portion for storing the second guide, the first storage portion being disposed farther toward the first side in the X-axis direction than the second storage portion, and the tension member is allowed to pass through both the first storage portion and the second storage portion, and wherein first and second direction changing members on which the tension member is suspended, and which cause a direction of the tension member to change in the Z-axis direction, are provided in the first storage portion, the first direction changing member being provided in a first end portion of the first storage portion, the first end portion of the first storage portion being on the first side in the Z-axis direction, the second direction changing member being provided in a second end portion of the first storage portion, the second end portion of the first storage portion being on the second side in the Z-axis direction, the wiring structure comprising:

a connector that is longitudinal in the Z-axis direction and forms the free end of the second guide, the connector being connected to an endmost second guide unit of the plurality of second guide units, the endmost second guide unit being positioned farthest toward the second side in the Z-axis direction when the second guide is stored in the second storage portion of the at least one slidable frame, and the connector having a female part and a male part, the male part being separate from and fixable to the female part, wherein the female part has a first end portion in the Z-axis direction and a second end portion in the Z-axis direction, the first end portion of the female part in the Z-axis direction being arranged farther toward the first side in the Z-axis direction, and the second end portion of the female part in the Z-axis direction being arranged farther toward the second side in the Z-axis direction, wherein the female part of the connector includes:

a pair of connecting pieces arranged at the first end portion of the female part in the Z-axis direction, the pair of connecting pieces opposing each other in the Y-axis direction, each connecting piece having a third opening, the second pins of the endmost second guide unit being fitted with clearance into the third openings of the pair of connecting pieces, respectively;

a fourth opening arranged at the second end portion of the female part in the Z-axis direction, the fourth opening being opened on at least one side in the X-direction; and a receiving portion which extends in the Z-axis direction and which is open on at least one side in the X-axis direction, the receiving portion being hollow, the male part of the connector includes a fixing piece having a first end portion in the Z-axis direction and a second end portion in the Z-axis direction, the first end portion of the fixing piece in the Z-axis direction being arranged farther toward the first side in the Z-axis direction, and the second end portion of the fixing piece in the Z-axis direction being arranged farther toward the second side in the Z-axis direction, wherein the fixing piece includes a fifth opening which is opened in the X-axis direction, wherein the male part is configured to be stored at least partially in the receiving portion in a position in which the fifth opening is in communication with the fourth opening, wherein the first end and the second end of the tension member are fixed to the male part, the male part of the connector has a first end portion in the Z-axis direction and a second end portion in the Z-axis direction, the first end portion of the male part in the Z-axis direction being arranged farther toward the first side in the Z-axis direction, and the second end portion of the male part in the Z-axis direction being arranged farther toward the second side in the Z-axis direction, and wherein the first end portion of the male part in the Z-axis direction has a first end portion in the Y-axis direction and a second end portion in the Y-axis direction, wherein the male part of the connector further comprises:

a pair of claws arranged at the first end portion of the male part in the Z-axis direction, the pair of claws protruding to the first side in the Z-axis direction at the first and second end portions in the Y-axis direction, respectively;

a first slit arranged at the first end portion of the male part in the Z-axis direction, the first slit extending toward the second side in the Z-axis direction, the first slit having a first end portion in the Z-axis direction and a second end portion in the Z-axis direction, the first end portion of the first slit in the Z-axis direction being arranged farther toward the first side in the Z-axis direction, and the second end portion of the first slit in the Z-axis direction being arranged farther toward the second side in the Z-axis direction;

an elongated hole extending from the first end portion of the male part in the Z-axis direction toward the second end portion of the male part in the Z-axis direction;

a window hole arranged in the second end portion of the male part in the Z-axis direction, the window hole having a first end in the Z-axis direction and a second end in the Z-axis direction; and a second slit extending from the second end of the window hole in the Z-axis direction toward an end, in the Z-axis direction, of the second end portion of the male part in the Z-axis direction, wherein the receiving part of the female part of the connector has a first end portion in the Z-axis direction and a second end portion in the Z-axis direction, the first end portion of the receiving part in the Z-axis direction being arranged farther toward the first side in the Z-axis direction, and the second end portion of the receiving part in the Z-axis direction being arranged farther toward the second side in the Z-axis direction, wherein the female part of the connector includes a pair of locking holes configured to be locked with the pair of claws of the male part of the connector, respectively, the pair of locking holes being formed at the first end portion of the receiving part in the Z-axis direction, and wherein the tension member includes a first portion which is suspended on the first direction changing member on the first side in the Z-axis direction and which includes the first end of the tension member in the Z-axis direction, and a second portion which is suspended on the second direction changing member on the second side in the Z-axis direction and which includes the second end of the tension member in the Z-axis direction, and in a state in which the tension member stored in the first storage portion of the at least one slidable frame is fixed to the free end of the first guide, both the first portion of the tension member on and the second portion of the tension member are configured to be drawn from one end in the X-axis direction of the first storage portion of the at least one slidable frame to an outside of the at least one slidable frame, a first ball knot is configured to be formed at a tip end of the first portion of the tension member and a second ball knot is configured to be formed at a tip end of the second portion of the tension member, the second ball knot is configured to be inserted into the second slit through the window hole of the male part of the connector and to be hooked and fixed to the second end portion of the male part in the Z-axis direction, a section of the first portion of the tension member between the first direction changing member and the first end of the tension member is configured to be hung around the second side in the X-axis direction of a head part of a first screw from the second side in the Z-axis direction, and the first ball knot is configured to be inserted into the first slit of the male part and to be hooked and fixed to the second end portion of the first slit in the Z-axis direction, the first screw is configured to be inserted into the elongated hole and to be temporarily tightened to a nut which is disposed at a portion of the first screw and protrudes from the elongated hole to the second side in the X-axis direction of the male part, the male part is configured to be inserted into the second storage portion through the first storage portion of the at least one slidable frame, each of the claws of the male part is configured to be stored in the second storage portion and to be inserted into and locked with a respective one of the locking holes of the receiving portion of the female part of the connector connected to the second guide unit, whereby the male part is configured to be stored in the receiving portion of the female part, and, in a stored state of the male part in the receiving portion of the female part, the fourth opening of the female part and the fifth opening of the male part communicate with each other, a second screw is configured to be tightened from the fifth opening such that the second screw extends into the fourth opening, whereby the male part is fastened and fixed to the female part, a tension applied to the tension member is configured to be adjusted by moving the first screw in the Z-axis direction along the elongated hole, and the first screw is configured to be completely tightened to the nut.

* * * * *